US009942315B2

(12) United States Patent
Simek

(10) Patent No.: US 9,942,315 B2
(45) Date of Patent: Apr. 10, 2018

(54) ANONYMOUS PEER STORAGE

(71) Applicant: International Business Machines Corporation, Armonk, NY (US)

(72) Inventor: Timothy R Simek, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 14/923,648

(22) Filed: Oct. 27, 2015

(65) Prior Publication Data
US 2017/0118013 A1    Apr. 27, 2017

(51) Int. Cl.
*H04L 29/08* (2006.01)
*H04L 9/08* (2006.01)

(52) U.S. Cl.
CPC .......... *H04L 67/104* (2013.01); *H04L 9/0894* (2013.01); *H04L 67/1097* (2013.01); *H04L 2209/42* (2013.01)

(58) Field of Classification Search
CPC .. H04L 9/0819; H04L 67/104; H04L 67/1097
USPC ....................................................... 713/171
See application file for complete search history.

(56) References Cited

U.S. PATENT DOCUMENTS

| 8,051,205 | B2 | 11/2011 | Roy et al. |
| 8,375,223 | B2 | 2/2013 | DeHaan et al. |
| 2007/0113274 | A1* | 5/2007 | Hariharan ........... H04L 63/0414 726/13 |
| 2010/0088269 | A1 | 4/2010 | Buller et al. |
| 2011/0107103 | A1* | 5/2011 | Dehaan ............... G06F 11/1456 713/171 |
| 2013/0173916 | A1 | 7/2013 | Sato |
| 2014/0201541 | A1 | 7/2014 | Paul et al. |

OTHER PUBLICATIONS

Bouffard, Daniel, Improving the speed of peer to peer backup systems with bit torrent, May 1, 2014.
Batten, Christopher pStore: a secure peer-to-peer backup system, date unknown printed on Oct. 8, 2015.

* cited by examiner

*Primary Examiner* — Hadi Armouche
*Assistant Examiner* — Angela Holmes
(74) *Attorney, Agent, or Firm* — Nolan M. Lawrence

(57) ABSTRACT

Techniques are described for anonymous peer storage. In one example, techniques include invoking an action of backing up one or more files utilizing distributed storage for a node Ni in a multi-node network; encrypting the one or more files into a combined encrypted file with a private key required to decrypt the combined encrypted file; splitting the combined encrypted file into Pi portions (P1, P2 . . . Pn) and associating a file identifier Fi to each Pi; anonymously distributing the Pi portions and associated identifier Fi to other nodes Nj and Nk wherein each of j and k is different from i; retaining a look up file containing for the each Pi, the (Nj, Nk) pairs, the Fi, and the private key for future retrieval and decryption; and responsive to receiving an anonymous request containing the Fi by one of the Nj and the Nk, returning the Pi.

12 Claims, 4 Drawing Sheets

US 9,942,315 B2

ANONYMOUS PEER STORAGE

TECHNICAL FIELD

The invention relates to systems and software for anonymous and secure data storage and retrieval on a peer to peer network.

BACKGROUND

A user has files on his computer or device that he wants to back up to a redundant network. He does not want to manually back up to an external secondary drive. The user is concerned about security of the files and does not want them falling into the wrong hands. The user considers a cloud hosted solution (e.g., Google Drive, Dropbox) and even an encrypted drive mirrored to that solution but dislikes that if breached, all data can be collected at once and perhaps in time recovered with a private key (or brute force decryption). Also, the user does not want a complete set of his data sitting (or seeded) anywhere on a single server.

SUMMARY

In general, examples disclosed herein are directed to techniques for peer to peer storage. In one example, techniques include invoking an action of backing up one or more files utilizing distributed storage for a node Ni in a multi-node network; encrypting the one or more files into a combined encrypted file with a private key required to decrypt the combined encrypted file; splitting the combined encrypted file into Pi portions (P1, P2 . . . Pn) and associating a file identifier Fi to each Pi; anonymously distributing the Pi portions and associated identifier Fi to other nodes Nj and Nk wherein each of j and k is different from i; retaining a look up file containing for the each Pi, the (Nj, Nk) pairs, the Fi, and the private key for future retrieval and decryption; and responsive to receiving an anonymous request containing the Fi by one of the Nj and the Nk, returning the Pi.

In other example, a computer system for includes one or more processors, one or more computer-readable memories, and one or more computer-readable, tangible storage devices. Program instructions are stored on at least one of the one or more storage devices for execution by at least one of the one or more processors via at least one of the one or more memories, to invoke an action of backing up one or more files utilizing distributed storage for a node Ni in a multi-node network; encrypt the one or more files into a combined encrypted file with a private key required to decrypt the combined encrypted file; split the combined encrypted file into Pi portions (P1, P2 . . . Pn) and associating a file identifier Fi to each Pi; anonymously distribute the Pi portions and associated identifier Fi to other nodes Nj and Nk wherein each of j and k is different from i; retain a look up file containing for the each Pi, the (Nj, Nk) pairs, the Fi, and the private key for future retrieval and decryption; and responsive to receiving an anonymous request containing the Fi by one of the Nj and the Nk, return the Pi.

In another example, a computer program product includes a computer-readable storage medium has program code embodied therewith. The program code is executable by a computing device to invoke an action of backing up one or more files utilizing distributed storage for a node Ni in a multi-node network; encrypt the one or more files into a combined encrypted file with a private key required to decrypt the combined encrypted file; split the combined encrypted file into Pi portions (P1, P2 . . . Pn) and associating a file identifier Fi to each Pi; anonymously distribute the Pi portions and associated identifier Fi to other nodes Nj and Nk wherein each of j and k is different from i; retain a look up file containing for the each Pi, the (Nj, Nk) pairs, the Fi, and the private key for future retrieval and decryption; and responsive to receiving an anonymous request containing the Fi by one of the Nj and the Nk, return the Pi.

DETAILED DESCRIPTION

Various examples are disclosed herein for peer to peer storage and methods for backing up data remotely. In one aspect, only portions of the data are backed up on any particular node. The file portions are unable to be collected or rebuilt by anyone other than the user himself. In other words, no collective knowledge of the greater network would be capable of piecing together all of his portions of data (which could allow retrieval of the full shared file set and a brute force decryption of his data.) There is no central hub with knowledge of peer relationships; all communication is via the originating user. The user can destroy his primary copy of data for a period of time and retrieve/rebuild it so long as he has the necessary keys to access it from the larger participating set of nodes.

Figure 1:
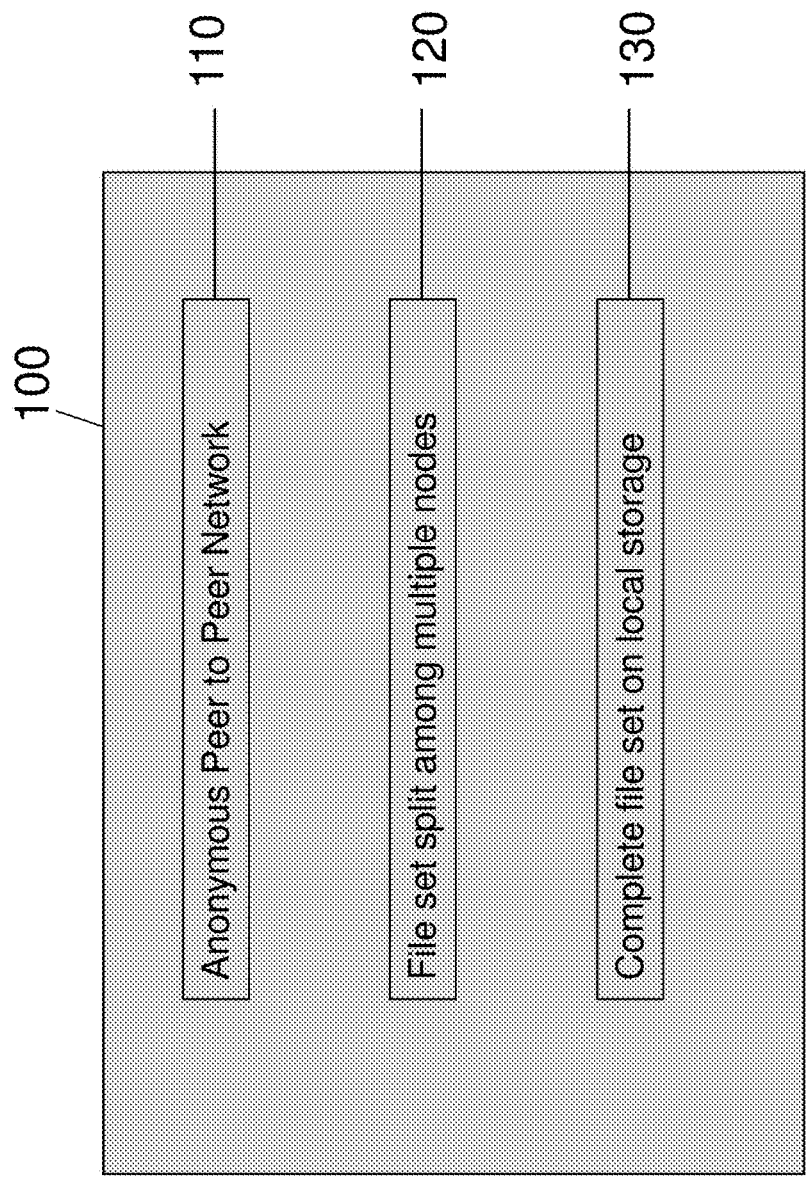
FIG. 1 is a block diagram illustrating a system for anonymous peer storage.

As shown in FIG. 1, a peer to peer storage system allows users to back up data via an anonymous peer to peer network 110. A full copy 130 of the data is stored only on a local machine. All other machines in the peer to peer storage system contain only a portion 120 of the data. Collectively, the redundancy nodes within the peer to peer network 110 do not know the location of the other pieces that make up the full file set.

In one implementation, the user dedicates a portion of his bandwidth and file storage to allow others the same service. The user is satisfied that their data is backed up to a redundant network in small encrypted chunks that cannot be collected and decrypted by anyone but himself.

Figure 4:
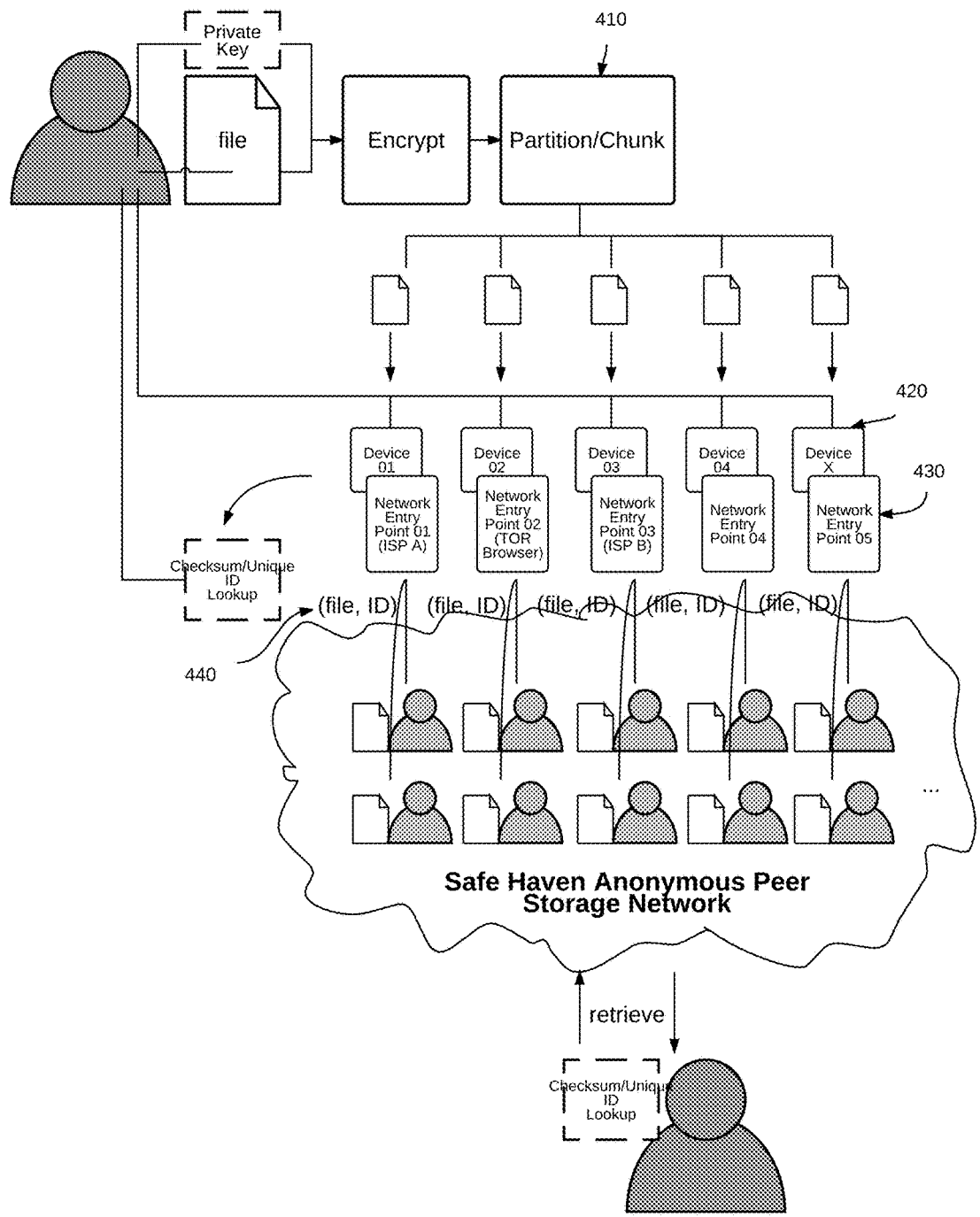
FIG. 4 is a flow diagram illustrating a process for anonymous peer storage

In one implementation, as illustrated in FIG. 4, a universe of network peers offer free storage to those urgently in need of an anonymous storage haven. A user living in a hostile region has large sets of sensitive data which he encrypts, partitions, and distributes as chunks 410 to users (with redundancy) using different devices 420 (e.g., personal computers, phones) and different network entry points 430 (e.g., internet service provider, 3G phone connection, public wireless internet connection, TOR browser connection) for various chunks. Files are distributed to a public network of publicly known hosts sharing space. Hosts are sharing free space to any requestor. Files sent via PUSH from the original user to specific chosen hosts in file and ID/checksum pairs 440. Redundancy is done by the original user by sending the same partition to multiple hosts. Each file push is written to the user's lookup file for purpose of retrieval later on. The original user remembers his encryption key and host/chunk lookup information, and destroys all traces of the original copy. His files are retrieved and rebuilt at a safer time in a safer physical location.

In one implementation, sensitive data such as WikiLeaks documents may be completely decentralized and anonymously stored on such a peer "Haven" network with document information shared to trusted users as encryption key and host/chunk lookup information.

Figure 2:
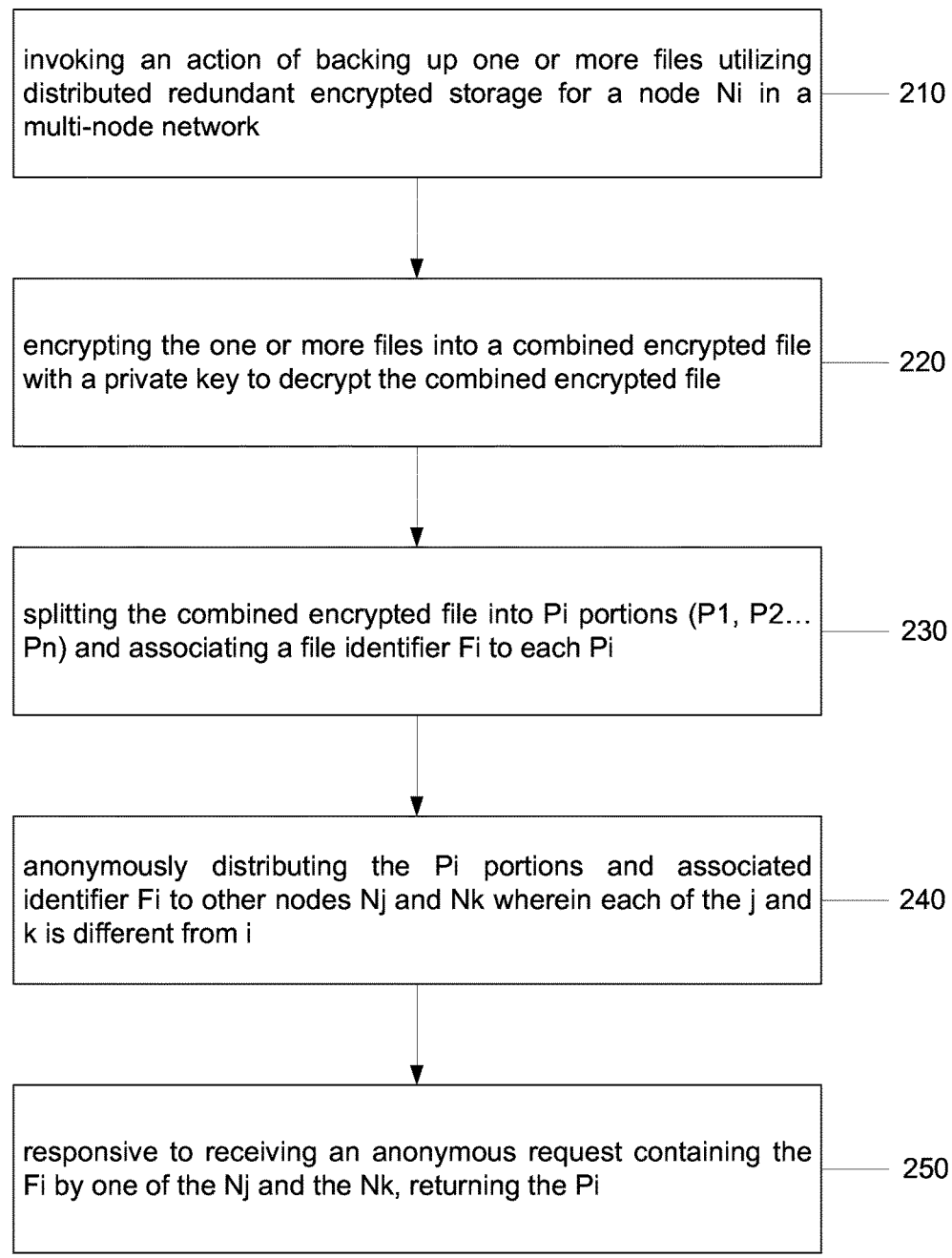
FIG. 2 is a flow diagram illustrating a method for anonymous peer storage.

As shown in FIG. 2, a method for anonymous peer storage in accordance with one embodiment of the invention includes invoking an action of backing up one or more files utilizing distributed redundant encrypted storage for a node Ni in a multi-node network (210); encrypting the one or more files into a combined encrypted file with a private key required to decrypt the combined encrypted file (220); splitting the combined encrypted file into Pi portions (P1, P2 ... Pn) and associating a file identifier Fi to each Pi (230); anonymously distributing the Pi portions and associated identifier Fi to other nodes Nj and Nk wherein each of j and k is different from i (step 240); retaining a look up file containing for the each Pi, the (Nj, Nk) pairs, the Fi, and the private key for future retrieval and decryption; and responsive to receiving an anonymous request containing the Fi by one of the Nj and the Nk, returning the Pi (step 250.)

The above method allows a user to back up his private files by using a desired encryption method to encrypt file set into single file and then split encrypted file into smaller file chunks. The file chunks are distributed to a collection of nodes on a peer to peer network. The distribution may include a mechanism for redundancy (multiple hosts contain a copy of the same single chunk.) The user's system retains a record of the hosts containing the data chunk and information about the chunk to identify it (e.g. checksum or unique identifier.)

A user participating in the peer to peer network receives incoming requests from an unknown remote user with an associated checksum or unique identifier. If a checksum or unique identifier matches a data chunk stored on the user's machine, the file chunk is sent back to the requester. For the requester, if there is no match they request the same file chunk from a redundant user. For the requester, once all data chunks are collected he can unencrypt and use his files.

Data that is stale or no longer of interest may be purged from the network by users that have not received a request for a data chunk in a desired period of time. And the user may destroy his primary copy of data for a period of time and retrieve/rebuild it so long as he has the necessary keys to access it from the larger participating set of nodes.

The above described techniques provide for the following features:
i) Data retrieval of an encrypted data chunk is anonymously requested from a peer node with a provided identifier. The peer node will release the data chunk to any requestor that provides a correct identifier.
ii) The universe of all storage nodes is shared knowledge (a list of all available hosts willing to share storage space), however all networking connections/partnerships are driven by the originating user. There is no master networking hub. This results in multiple 1-way (and 1-to-1) connections of (masked originating user, storage node) pairs.
iii) The protocol governs that storage nodes do not have knowledge of how many data chunks exist in any particular data set.
iv) The protocol governs that any given storage node does not have knowledge of any other storage node sharing a common data set.
v) The protocol governs that any given storage node does not have knowledge of which other storage nodes are communicating with the same originating user.

Figure 3:
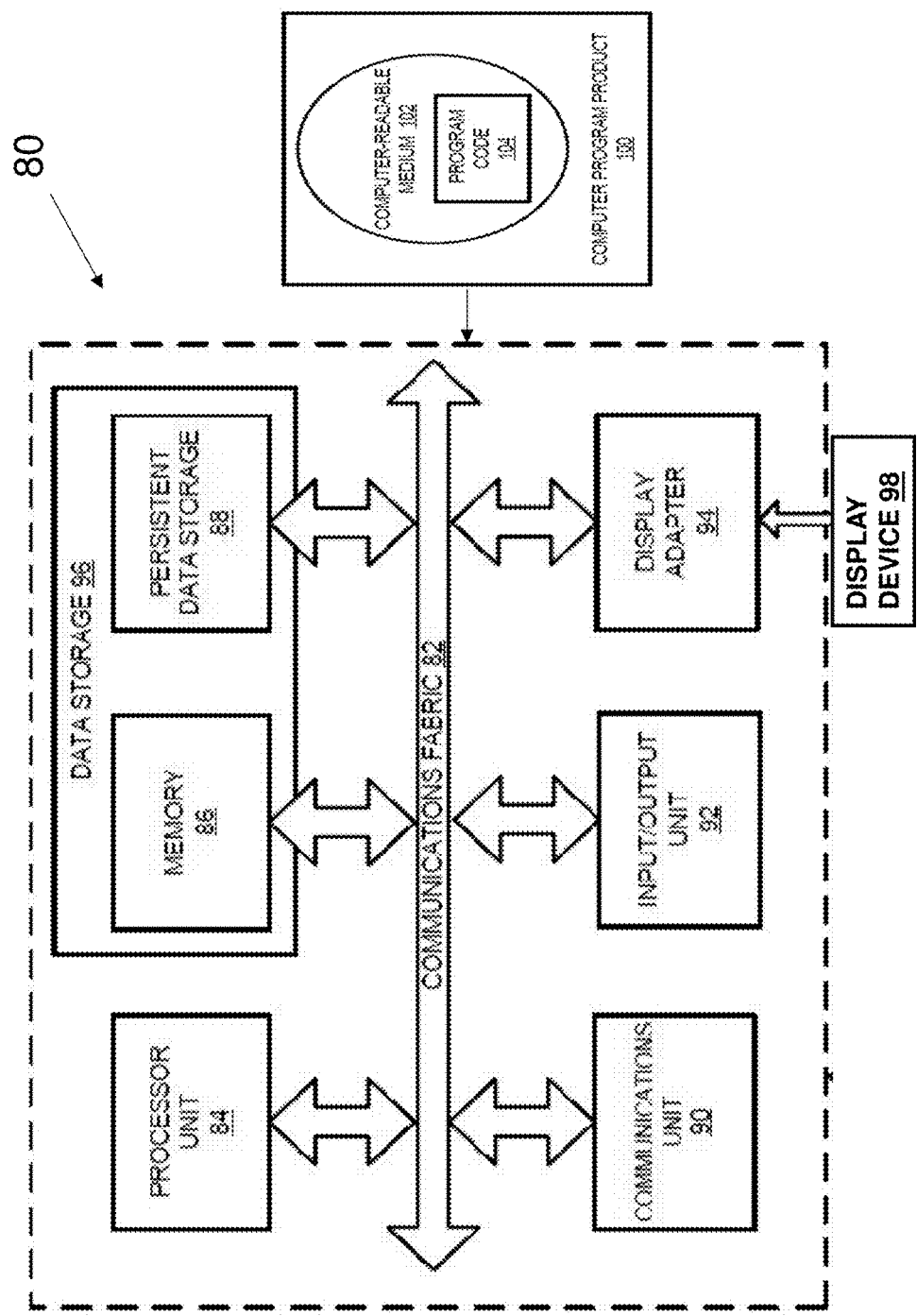
FIG. 3 is a block diagram of a computing device for anonymous peer storage.

In the illustrative example of FIG. 3, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Some examples may use such a non-transitory medium. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a semantic model constructor 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of IBM CONFIDENTIAL D-2 the invention.

It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for distributed storage, the method comprising:
    invoking an action of backing up one or more files utilizing distributed storage for a user at a node Ni in a multi-node network;
    allocating to the user an amount of storage space in the distributed storage in proportion to how much local storage space the user provides to the distributed storage for other users;
    encrypting the one or more files into a combined encrypted file with a private key required to decrypt the combined encrypted file;
    splitting the combined encrypted file into Pi portions (P1, P2 . . . Pn) and associating a file identifier Fi to each Pi;
    anonymously distributing the Pi portions and associated identifier Fi to other nodes Nj and Nk wherein each of j and k is different from i, and wherein the anonymously distributing includes distributing a given Pi portion to more than one node such that there is redundancy of storage, and wherein nodes Nj and Nk do not have knowledge of how many data portions of the encrypted file exist, and wherein nodes Nj and Nk do not have knowledge of any other storage node sharing a common data set, and wherein nodes Nj and Nk do not have knowledge of other storage nodes communicating with the user;
    retaining a look up file containing for the each Pi, the (Nj, Nk) pairs, the Fi, and the private key for future retrieval and decryption;
    purging Pi portions that are stale or no longer of interest; and
    responsive to receiving an anonymous request containing the Fi by one of the Nj and the Nk, returning the Pi.

2. The method of claim 1, further comprising:
    providing a user interface (UI) allowing a user to participate as a storage node in the distributed storage.

3. The method of claim 2, further comprising:
    responsive to a user utilizing the UI for the one or more files, identifying
    placement and associated identifiers for the one or more files.

4. The method of claim 1, further comprising:
    destroying the combined encrypted file; and
    rebuilding it from the Pi portions.

5. A computer system comprising:
    one or more processors, one or more computer-readable memories, and one or more computer-readable, tangible storage devices;
    program instructions, stored on at least one of the one or more storage devices for execution by at least one of the one or more processors via at least one of the one or more memories to:
    invoke an action of backing up one or more files utilizing distributed storage for a user at a node Ni in a multi-node network;
    allocate to the user an amount of storage space in the distributed storage in proportion to how much local storage space the user provides to the distributed storage for other users;
    encrypt the one or more files into a combined encrypted file with a private key required to decrypt the combined encrypted file; split the combined encrypted file into Pi portions (P1, P2 . . . Pn) and associating a file identifier Fi to each Pi;
    anonymously distribute the Pi portions and associated identifier Fi to other nodes Nj and Nk wherein each of j and k is different from i, and wherein the anonymously distribution includes distribute a given Pi portion to more than one node such that there is redundancy of storage;
    retain a look up file containing for the each Pi, the (Nj, Nk) pairs, the Fi, and the private key for future retrieval and decryption;
    purge Pi portions that are stale or no longer of interest; and
    responsive to receiving an anonymous request containing the Fi by one of the Nj and the Nk, return the Pi.

6. The system of claim 5, further comprising:
    program instructions, stored on at least one of the one or more storage devices for execution by at least one of the one or more processors via at least one of the one or more memories to provide a user interface (UI) allowing a user to participate as a storage node in the distributed storage.

7. The system of claim 6, further comprising:
    program instructions, stored on at least one of the one or more storage devices for execution by at least one of the one or more processors via at least one of the one or more memories to, responsive to a user utilizing the UI for the one or more files, identify placement and associated identifiers for the one or more files.

8. The system of claim 5, further comprising:
    program instructions, stored on at least one of the one or more storage devices for execution by at least one of the one or more processors via at least one of the one or more memories to destroy the combined encrypted file and rebuild it from the Pi portions.

9. A computer program product comprising a computer-readable storage medium having program code embodied therewith, the program code executable by a computing device to:
    invoke an action of backing up one or more files utilizing distributed storage for a user at a node Ni in a multi-node network;
    allocate to the user an amount of storage space in the distributed storage in proportion to how much local storage space the user provides to the distributed storage for other users;
    encrypt the one or more files into a combined encrypted file with a private key required to decrypt the combined encrypted file;
    split the combined encrypted file into Pi portions (P1, P2 . . . Pn) and associating a file identifier Fi to each Pi;
    anonymously distributing the Pi portions and associated identifier Fi to other nodes Nj and Nk wherein each of j and k is different from i, and wherein the anonymously distributing includes distributing a given Pi portion to more than one node such that there is redundancy of storage;
    retain a look up file containing for the each Pi, the (Nj, Nk) pairs, the Fi, and the private key for future retrieval and decryption;
    purge Pi portions that are stale or no longer of interest; and responsive to receiving an anonymous request containing the Fi by one of the Nj and the Nk, return the Pi.

10. The program product of claim 9, further comprising:
code executable to provide a user interface (UI) allowing a user to participate as a storage node in the distributed storage.

11. The program product of claim 10, further comprising:
code executable to, responsive to a user utilizing the UI for the one or more files, identify placement and associated identifiers for the one or more files.

12. The program product of claim 9, further comprising:
code executable to destroy the combined encrypted file and rebuild it from the Pi portions.

* * * * *